United States Patent
Nakayama

(10) Patent No.: US 7,916,962 B2
(45) Date of Patent: Mar. 29, 2011

(54) DATA TRANSFORMING APPARATUS AND CONTROL METHOD THEREOF

(75) Inventor: Tadayoshi Nakayama, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/636,885

(22) Filed: Dec. 14, 2009

(65) Prior Publication Data

US 2010/0166329 A1 Jul. 1, 2010

(30) Foreign Application Priority Data

Dec. 25, 2008 (JP) ................................ 2008-331190

(51) Int. Cl.
*G06K 9/46* (2006.01)
*H04N 11/02* (2006.01)
*G06F 17/14* (2006.01)

(52) U.S. Cl. .................... 382/244; 375/240.18; 708/400

(58) Field of Classification Search .................. 382/169, 382/233, 238, 239, 244, 246, 248, 250, 276, 382/277, 280, 281, 302; 348/254, 580, 671; 375/240.2, 240.18, 258; 704/269; 708/400
See application file for complete search history.

(56) References Cited

U.S. PATENT DOCUMENTS

| 7,127,115 | B2 * | 10/2006 | Osawa et al. | 382/239 |
| 7,188,132 | B2 * | 3/2007 | Nakayama | 708/400 |
| 7,194,140 | B2 * | 3/2007 | Ito et al. | 382/251 |
| 7,257,264 | B2 * | 8/2007 | Nakayama et al. | 382/239 |

FOREIGN PATENT DOCUMENTS

JP 2003-258645 A 9/2003

OTHER PUBLICATIONS

Fukuma, Shinji et al. "Lossless 8-point fast discrete cosine transform using lossless hadamard transform", IEICE Technical Report, IE99-65, pp. 37-44, Oct. 1999.; English abstract provided.

* cited by examiner

*Primary Examiner* — Abolfazl Tabatabai
(74) *Attorney, Agent, or Firm* — Rossi, Kimms & McDowell LLP

(57) ABSTRACT

This invention implements a fast lossless transform almost free from a delay with a small calculation amount. The lossless transform can be used to perform lossless coding and lossy coding quickly. A first calculation unit multiplies data D0, D1, D2, and D3 input to the input terminals by respective weighting coefficients {a0, a1, a2, a3} of {½, −½, −½, −½}, and summates the products. A rounding unit in the first calculation unit rounds the sum into an integer and outputs the integer value E. A second calculation unit multiplies the value E by weighting coefficients {b0, b1, b2, b3} of {−1, 1, 1, 1} set for the respective input data, and adds the products to the respective input data. This invention sets, for the relationship between the first and second weighting coefficients, a condition that $a0*b0+a1*b1+a2*b2+a3*b3=-2$ or $0$.

5 Claims, 10 Drawing Sheets

FIG. 5A

| EXAMPLE OF TRANSFORMED DATA IN FIG. 3 | | | | |
|---|---|---|---|---|
| INPUT DATA | 7 | 9 | 2 | 5 |
| OUTPUT FROM FIRST CALCULATION UNIT | 11 | | | |
| TRANSFORM RESULT | −4 | −2 | −9 | −6 |
| INPUT DATA IN INVERSE TRANSFORM | −4 | −2 | −9 | −6 |
| OUTPUT FROM FIRST CALCULATION UNIT | −11 | | | |
| INVERSE TRANSFORM RESULT | 7 | 9 | 2 | 5 |

FIG. 5B

| EXAMPLE OF TRANSFORMED DATA IN FIG. 4 | | | | |
|---|---|---|---|---|
| INPUT DATA | 7 | 9 | 2 | 5 |
| OUTPUT FROM FIRST CALCULATION UNIT | 23 | | | |
| TRANSFORM RESULT | −4 | −3 | −10 | −6 |
| INPUT DATA IN INVERSE TRANSFORM | −4 | −3 | −10 | −6 |
| OUTPUT FROM FIRST CALCULATION UNIT | −23 | | | |
| INVERSE TRANSFORM RESULT | 7 | 9 | 2 | 5 |

FIG. 11A

| EXAMPLE OF TRANSFORMED DATA IN FIG. 9 | | | | |
|---|---|---|---|---|
| INPUT DATA | 3 | 9 | 2 | 5 |
| OUTPUT FROM FIRST CALCULATION UNIT | 2 | | | |
| TRANSFORM RESULT | 7 | 1 | 0 | 1 |
| INPUT DATA IN INVERSE TRANSFORM | 7 | 1 | 0 | 1 |
| OUTPUT FROM FIRST CALCULATION UNIT | −2 | | | |
| INVERSE TRANSFORM RESULT | 3 | 9 | 2 | 5 |

FIG. 11B

| EXAMPLE OF TRANSFORMED DATA IN FIG. 10 | | | | |
|---|---|---|---|---|
| INPUT DATA | 3 | 9 | 3 | 6 |
| OUTPUT FROM FIRST CALCULATION UNIT | 6 | | | |
| TRANSFORM RESULT | 9 | −3 | 0 | 0 |
| INPUT DATA IN INVERSE TRANSFORM | 9 | −3 | 0 | 0 |
| OUTPUT FROM FIRST CALCULATION UNIT | −6 | | | |
| INVERSE TRANSFORM RESULT | 3 | 9 | 3 | 6 |

DATA TRANSFORMING APPARATUS AND CONTROL METHOD THEREOF

BACKGROUND OF THE INVENTION

1. Field of the Invention

The present invention relates to a data transforming technique capable of lossless transformation of nth-order integer data into nth-order integer data in a lossless orthogonal transform essential for transforming image data of each block and processing lossless coding and lossy coding by a unified scheme, in order to particularly implement various kinds of lossless rotational transforms which form the lossless orthogonal transform.

2. Description of the Related Art

An image, especially a multi-valued image, includes many pieces of information, and requires a huge memory capacity for storage and a lot of time for transmission. The storage and transmission of an image uses high-efficiency coding to reduce the amount of data by removing redundancy of the image or changing its contents to a level at which the deterioration of image quality is visually unrecognizable.

For example, JPEG, which is recommended by ISO and ITU-T as an international standard coding scheme for still images, transforms image data of each block (8×8 pixels) into a DCT coefficient by executing a discrete cosine transform (DCT). JPEG quantizes each coefficient and entropy-encodes the quantized coefficient, compressing the image data. Other compression techniques using the DCT are H.261 and MPEG-1/2/4 in addition to JPEG.

In the JPEG standard, lossless coding was also standardized to make a compressed/decompressed image completely match an original image. In those days, studies of lossless transform techniques did not make remarkable progress, and a lossless transform using the DCT could not be implemented. Lossless coding was therefore performed not by block transform coding using the DCT but by predictive coding of each pixel.

Later, an international standard (JPEG-LS) dedicated to lossless coding of still images was established. However, in this standard lossless transform technique was not used. The JPEG 2000 using a lossless wavelet transform for lossless image coding became an international standard later on. The lossless wavelet transform is a lossless transform from an integer data set to an integer data set. Coding using a lossless transform can literally achieve lossless coding unless the transmission coefficient is quantized. The intervention of quantization processing enables lossy coding. That is, this coding can seamlessly perform lossless coding and lossy coding by the same transform scheme. With this advantage, coding using the lossless transform is adopted even in JPEG-XR, which is now being internationally standardized.

One conventional technique for achieving a lossless transform uses ladder calculations (lifting calculations). A typical example of this method is described in Shinji Fukuma, Koichi Ohyama, Masahiro Iwahashi, and Noriyoshi Kambayashi, "Lossless 8-Point Fast Discrete Cosine Transform Using Lossless Hadamard Transform", IEICE technical report, IE99-65, pp. 37-44, October 1999. In this reference, the lossless transform is implemented by complicated procedures of decomposing a transform matrix into triangular matrices and replacing them with ladder calculations. Therefore, this arrangement is complex and requires a large amount of calculation processing.

Japanese Patent Laid-Open No. 2003-258645 discloses a lossless transform method limited to the Hadamard transform. The method disclosed in this reference rounds up the fractional parts of an odd number of data and rounds down those of another odd number of data for transform coefficients of fractional data obtained by a linear Hadamard transform. This reference has a feature in the rounding method, and does not devise to reduce calculations of the linear Hadamard transform or decrease the amount of processing necessary for round processing.

As described above, conventional lossless transform techniques need to perform redundant processing by ladder calculations in order to attain reversibility. This obstructs high-speed lossless coding and lossy coding using a lossless transform.

SUMMARY OF THE INVENTION

The present invention has been made to overcome the conventional drawbacks. The invention provides a technique of performing a lossless transform more quickly. The invention also provides a technique of performing the lossless Hadamard Transform using small circuit.

To solve the conventional problems, the present invention in its first aspect provides a data transforming apparatus including input terminals for inputting a plurality of input data and output terminals for outputting a plurality of transform results, the apparatus comprising:

a first calculation unit which multiplies data input to the input terminals by first weighting coefficients set for the respective input data and summates weighted data;

a second calculation unit which multiplies calculation results obtained from the first calculation unit by second weighting coefficients set for the respective input data and adds products to the respective input data; and a rounding unit which is arranged in at least one of the first calculation unit and the second calculation unit that multiplies non-integer weighting coefficients, and rounds non-integer calculation results into integers, wherein a sum of products of first weighting coefficient and second weighting coefficient for respective input data takes either of 0 or −2.

The present invention in its second aspect provides a method of controlling a data transforming apparatus which generates a plurality of transformed data from a plurality of input data and outputs the transformed data, the method comprising:

a first calculation step of causing a first calculation unit to multiply the input data by first weighting coefficients set for the respective input data and summate weighted data;

a second calculation step of causing a second calculation unit to multiply calculation results obtained in the first calculation step by second weighting coefficients set for the respective input data and add products to the respective input data; and a rounding step of causing a rounding unit to round non-integer calculation results into integers in at least one of the first calculation step and the second calculation step in which non-integer weighting coefficients are multiplied, wherein a sum of products of first weighting coefficient and second weighting coefficient for respective input data takes either of 0 or −2.

The present invention can implement a fast lossless transform that is almost free from delay with a small amount of calculation. The lossless transform can perform lossless coding and lossy coding quickly. In particular, both software and hardware processes can execute a calculation capable of implementing a fast lossless Hadamard transform by the same description. This allows development of software and hardware together.

Especially, when the configuration of lossless Hadamard Transform shown in FIG. 7 is implemented to a hardware circuit, the size of the circuit can be smaller than conventional other circuits and the circuit needs little electricity to work. This means that it is useful for a industrial product compressing data.

Further features of the present invention will become apparent from the following description of exemplary embodiments with reference to the attached drawings.

BRIEF DESCRIPTION OF THE DRAWINGS

FIGS. 5A and 5B are tables showing examples of concrete transformed data in the first embodiment;

FIGS. 11A and 11B are tables showing examples of concrete transformed data according to the third embodiment;

DESCRIPTION OF THE EMBODIMENTS

In the following embodiments, a lossless transform based on an arrangement shown in FIG. 1 will be explained. First, a transform implemented by the arrangement of FIG. 1 will be described in detail.

Figure 1:
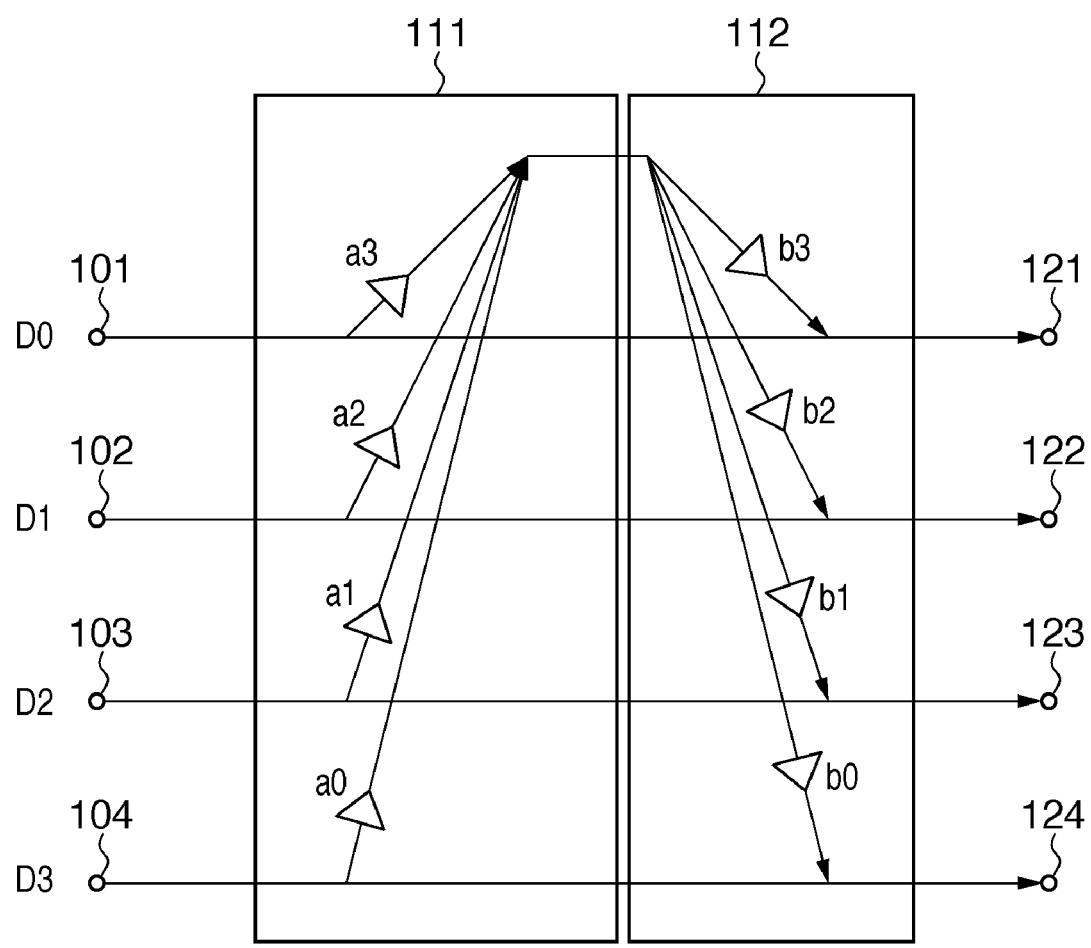
FIG. 1 is a diagram of a basic data transforming apparatus for a lossless transform in the present invention.

The apparatus in FIG. 1 includes a first calculation unit 111 and second calculation unit 112. The first calculation unit 111 multiplies four data D0, D1, D2, and D3 input from input terminals 101, 102, 103, and 104 by weighting coefficients a0, a1, a2, and a3. The first calculation unit 111 summates (calculates the sum of) the weighted data, generating and outputting a sum E:

$$E = a0*D0 + a1*D1 + a2*D2 + a3*D3$$

The second calculation unit 112 multiplies the sum E by second weighting coefficients b0, b1, b2, and b3 set for the respective input data. The second calculation unit 112 adds the products to the input data D0, D1, D2, and D3, i.e., calculates D0+b0\*E, D1+b1\*E, D2+b2\*E, and D3+b3\*E. The second calculation unit 112 then outputs the sums from output terminals 121 to 124.

The transform matrix of this transform can be expressed as $$\begin{bmatrix} 1+a0b0 & a1b0 & a2b0 & a3b0 \\ a0b1 & 1+a1b1 & a2b1 & a3b1 \\ a0b2 & a1b2 & 1+a2b2 & a3b2 \\ a0b3 & a1b3 & a2b3 & 1+a3b3 \end{bmatrix} \quad (1)$$

A determinant T of matrix (1) is $$T = 1 + a0b0 + a1b1 + a2b2 + a3b3 \quad (2)$$

An inverse transform matrix of matrix (1) is $$\begin{bmatrix} 1-\frac{a0b0}{T} & -\frac{a1b0}{T} & -\frac{a2b0}{T} & -\frac{a3b0}{T} \\ -\frac{a0b1}{T} & 1-\frac{a1b1}{T} & -\frac{a2b1}{T} & -\frac{a3b1}{T} \\ -\frac{a0b2}{T} & -\frac{a1b2}{T} & 1-\frac{a2b2}{T} & -\frac{a3b2}{T} \\ -\frac{a0b3}{T} & -\frac{a1b3}{T} & -\frac{a2b3}{T} & 1-\frac{a3b3}{T} \end{bmatrix} \quad (3)$$

In lossless transform coding, the value of the determinant T of the matrix needs to be −1 or +1 to prevent addition of redundancy or degeneracy of information upon transform.

To set the value of the determinant T of matrix to −1, a0\*b0+a1\*b1+a2\*b2+a3\*b3=−2 must hold.

To set the value of the determinant T of matrix to +1, a0\*b0+a1\*b1+a2\*b2+a3\*b3=0 must hold.

These setting conditions are imposed on the weighting coefficients of the first calculation unit 111 and second calculation unit 112.

Inverse transform matrices for the determinant T of matrix=−1 and +1 are

<Inverse Matrix for Determinant T of Matrix=−1>

$$\begin{bmatrix} 1+a0b0 & a1b0 & a2b0 & a3b0 \\ a0b1 & 1+a1b1 & a2b1 & a3b1 \\ a0b2 & a1b2 & 1+a2b2 & a3b2 \\ a0b3 & a1b3 & a2b3 & 1+a3b3 \end{bmatrix} \quad (4a)$$

<Inverse Matrix for Determinant T of Matrix=1>

$$\begin{bmatrix} 1-a0b0 & -a1b0 & -a2b0 & -a3b0 \\ -a0b1 & 1-a1b1 & -a2b1 & -a3b1 \\ -a0b2 & -a1b2 & 1-a2b2 & -a3b2 \\ -a0b3 & -a1b3 & -a2b3 & 1-a3b3 \end{bmatrix} \quad (4b)$$

Inverse matrices (4a) and (4b) reveal that the transform matrix and inverse transform matrix have an interesting relationship. That is, for the determinant T of matrix=−1, transform matrix (1) and inverse transform matrix (4a) completely match each other. For the determinant T of matrix=+1, inverse transform matrix (4b) is obtained by reversing the signs of the weighting coefficients a0, a1, a2, and a3 or the weighting coefficients b0, b1, b2, and b3 in the transform matrix (1).

The present invention ensures reversibility in transforming integer data into integer data by using the similarity between a transform matrix (forward transform matrix) and an inverse transform matrix.

Figure 2:
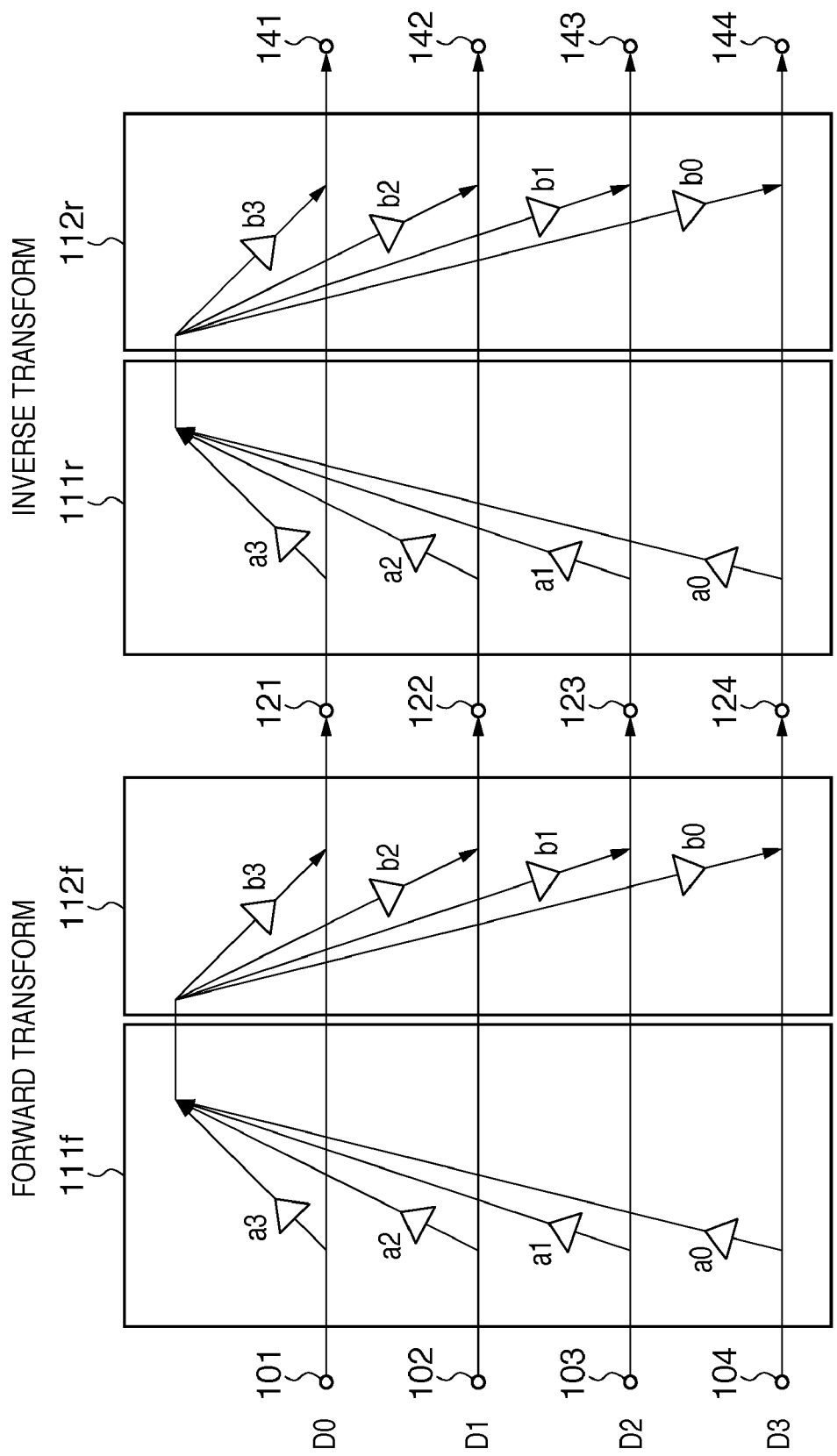
FIG. 2 is a diagram for explaining reversibility when the determinant of matrix is −1.

Attention is paid to data transform processing shown in FIG. 2 in which a transform and inverse transform are sequentially processed for the determinant T of matrix=−1 to transform and then inversely transform input data, thereby decoding original input data. In FIG. 2, the forward transform side and inverse transform side have the same arrangement. For descriptive convenience, "f" is suffixed to the reference numerals of the first and second calculation units on the forward transform side, and "r" is suffixed to those of the first and second calculation units on the inverse transform side. Reference numerals 141 to 144 denote output terminals on the inverse transform side.

The result of forward transform in this data transform processing is generally fractional data and is basically not an integer. As will be described later, the calculation result of a first calculation unit 111$f$ on the forward transform side and that of a first calculation unit 111$r$ on the inverse transform side have the same absolute value with opposite signs. Based on this relationship, reversibility by the data transforming apparatus can be explained.

On the forward transform side, a second calculation unit 112$f$ multiplies the calculation result of the first calculation unit 111$f$ by the second weighting coefficient, and adds the product to each input data. On the inverse transform side, a second calculation unit 112$r$ multiplies, by the same second weighting coefficient, the calculation result of the first calculation unit 111$r$ having a sign opposite to that of the first calculation unit 111$f$, and adds the product to inversely transformed input data. Consequently, data added on the forward transform side and that added on the inverse transform side cancel each other, leaving only input data.

In general, the result of forward transform is fractional data. Reversibility can be obtained if "added data in transform and added data in inverse transform can cancel each other" in the above-described way, even when fractional data is rounded into integer data. For this purpose, the relationship in which the calculation result of the first calculation unit 111$f$ on the forward transform side and that of the first calculation unit 111$r$ on the inverse transform side have opposite signs needs to be analyzed in more detail.

In the data transform processing shown in FIG. 2, a transmission coefficient from the output of the first calculation unit 111$f$ on the forward transform side to that of the first calculation unit 111$r$ on the inverse transform side is −2 from the relation "a0*b0+a1*b1+a2*b2+a3*b3=−2".

It means that a calculation result E of the first calculation unit 111$f$ on the forward transform side is contained in the calculation result of the first calculation unit 111$r$ on the inverse transform side as a transmission signal of −2E based on the transmission coefficient. In addition to the transmission signal of −2E, the calculation result of the first calculation unit 111$r$ on the inverse transform side contains the calculation result of the first calculation unit 111$r$ on the inverse transform side for input data on the forward transform side. A signal corresponding to this calculation result is E, similar to the calculation result of the first calculation unit 111$f$ on the forward transform side.

The calculation result of the first calculation unit 111$r$ on the inverse transform side finally becomes −2E+E=−E. From this, the calculation result of the first calculation unit 111$r$ on the inverse transform side is opposite in sign to the calculation result E of the first calculation unit 111$f$ on the forward transform side.

To maintain reversibility in the integer transform, the transmission coefficient "−2" needs to be held even after converting fractional data into an integer. As a processing method concerning round processing for this purpose, the following three methods are conceivable. Before a description of the embodiments, these three methods will be explained at once to clarify the difference between them.

Figure 3:
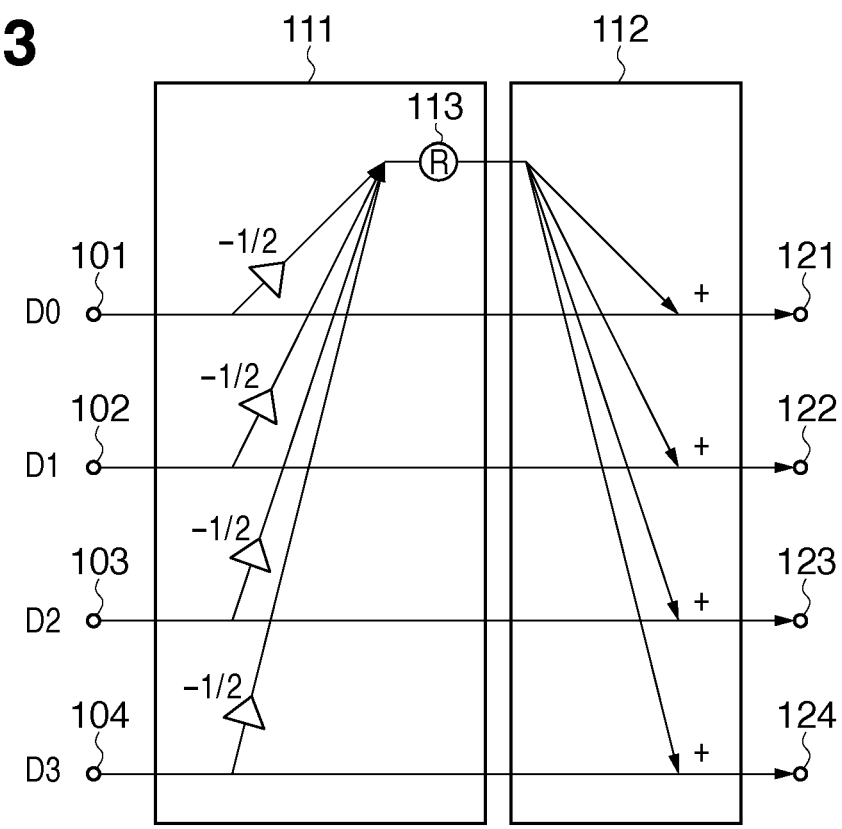
FIG. 3 is a diagram of a data transforming apparatus according to the first embodiment.

As the first calculation method, all weighting coefficients at which fractional data are generated are collected to the first calculation unit. A rounding unit at the final stage of the first calculation unit rounds fractional data into an integer value, which serves as the calculation result of the first calculation unit. The second calculation unit multiplies the integer value by a limited second weight and adds the product to input data. The arrangement of the first calculation unit having the rounding unit is shown in FIG. 3, which shows the first embodiment to be described later.

By performing transform processing and inverse transform processing according to this calculation method, no round processing need be done till input to the rounding unit of the first calculation unit on the inverse transform side after output from the first calculation unit on the transform side. As long as the condition "a0*b0+a1*b1+a2*b2+a3*b3=−2" is met, a transmission value whose signal source is the output of the first calculation unit on the transform side becomes −2E precisely and reaches the rounding unit of the first calculation unit on the inverse transform side.

The transmission value "−2E" is truly an integer value, does not contain fractional data, and thus does not undergo round processing. The transmission coefficient accurately keeps "−2", maintaining reversibility.

Figure 4:
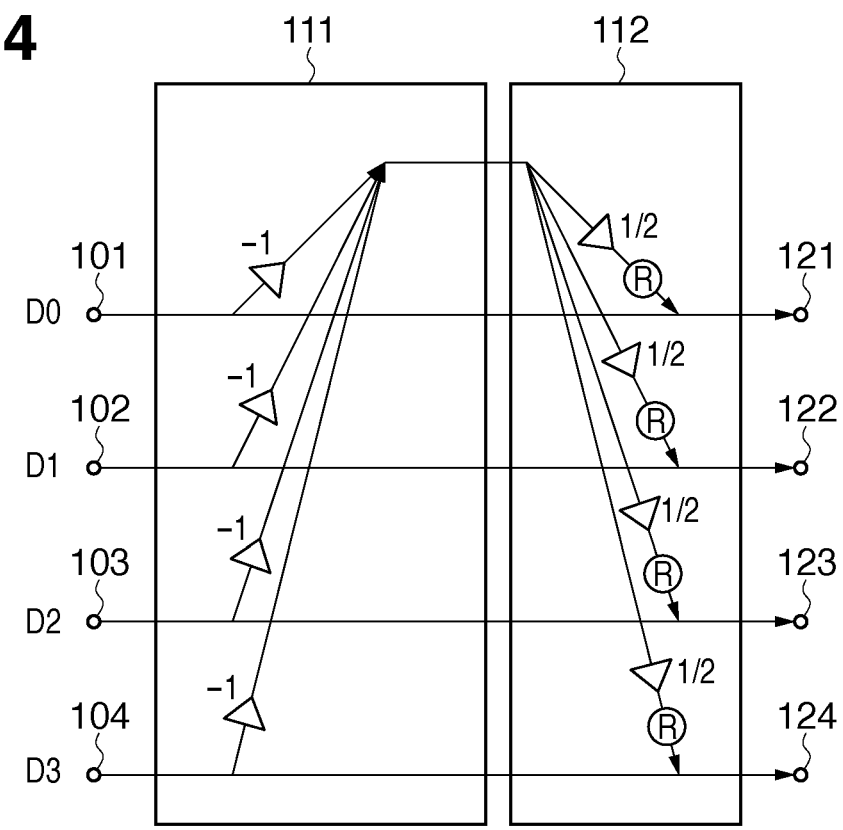
FIG. 4 is a diagram of another data transforming apparatus according to the first embodiment.

The second method is a rounding method when the second weighting coefficient is a non-integer value. The arrangement of the second calculation unit having the rounding unit is shown in FIG. 4, which shows the second embodiment to be described later. A fractional value generated by multiplication of the second weighting coefficient is rounded down. The rounded-down value is superposed on another signal to transmit the resultant signal. To the contrary, when the fractional value is rounded up, the rounded-up component is subtracted from another signal to transmit the resultant signal.

When superposing a rounded-down or -up component on another signal to transmit the resultant signal, the value to be superposed needs to be adjusted so that a desired transmission value is finally obtained in consideration of the first weighting coefficient for the signal. An example of this method will be explained in the third embodiment to be described later. In this manner, the second method obtains the transmission coefficient "−2" accurately.

The third method as well as the second one is a rounding method when the second weighting coefficient is a non-integer value. The second method assigns different round processes to paired data. In contrast, the third processing method expands the processing to three or more data. In this processing, every time the fractional value of the calculation result of the first calculation unit increases by 1/n, one of n signals is incremented by one to transmit the signals every increment of 1/n.

Assume that the three second weighting coefficients b0, b1, and b2 are ⅓. After signals are multiplied by the weighting coefficients, the fractional part of one signal is simply rounded down to an integer, that of another signal is rounded down to an integer after the addition of ⅓, and that of the remaining signal is rounded down to an integer after the addition of ⅔. Accordingly, the three signals can be transmitted in units of ⅓.

Also assume that the two second weighting coefficients b0 and b1 are ½. After signals are multiplied by the weighting coefficients, the fractional part of one signal is rounded down into an integer, and that of the other signal is rounded up into an integer. The signals can therefore be transmitted using the unit of ½. By transmitting the unit of 1/n using n signals, the transmission coefficient "−2" is maintained.

Detailed adjustment of round processing to obtain the transmission coefficient "−2" changes depending on the value of the weighting coefficient and introduction of approximate calculation. It is impossible to describe all situations in this specification. However, general ideas can be roughly classified into these three methods.

Embodiments according to the present invention will be described below.

First Embodiment

FIGS. 3 and 4 show the arrangement of a data transforming apparatus (data transforming circuit) in the first embodiment of the present invention. When round processing to obtain an integer is ignored, the transform matrix of either transform is given by $$\begin{bmatrix} \frac{1}{2} & \frac{1}{2} & \frac{1}{2} & \frac{1}{2} \\ -\frac{1}{2} & \frac{1}{2} & -\frac{1}{2} & -\frac{1}{2} \\ -\frac{1}{2} & -\frac{1}{2} & \frac{1}{2} & -\frac{1}{2} \\ -\frac{1}{2} & -\frac{1}{2} & -\frac{1}{2} & \frac{1}{2} \end{bmatrix} = \frac{1}{2}\begin{bmatrix} 1 & -1 & -1 & -1 \\ -1 & 1 & -1 & -1 \\ -1 & -1 & 1 & -1 \\ -1 & -1 & -1 & 1 \end{bmatrix} \quad (5)$$

The physical meaning of this transform is to subtract the DC components of four input data from the respective input data.

In terms of compression coding, this transform is not so important, but is the simplest transform suited to explaining reversibility in the present invention and thus is exemplified in the present invention.

There are many combinations of the first and second weighting coefficients for one transform matrix, and several types of implementations exist in accordance with them. Two typical arrangements will be described. FIG. 3 shows an arrangement when all first weighting coefficients a0, a1, a2, and a3 are set to "−½" and all second weighting coefficients b0, b1, b2, and b3 are set to an integer value "1". FIG. 4 shows an arrangement when all the first weighting coefficients a0, a1, a2, and a3 are set to an integer value "−1" and all the second weighting coefficients b0, b1, b2, and b3 are set to "½".

Reversibility in FIG. 3 can be explained by the first one of the three methods mentioned above, and that in FIG. 4 can be explained by the third one.

In both FIGS. 3 and 4, four input data will be referred to as the first, second, third, and fourth input data sequentially from the top, and data during calculation will be referred to as the first, second, third, and fourth data. This also applies to a description of the remaining embodiments.

These two transforms are completely the same except for round processing to obtain an integer, but exhibit slightly different transform results because signals to undergo this processing are different.

The arrangement of FIG. 3 calculates F=a0*D0+a1*D1+ a2*D2+a3*D3=(−D0−D1−D2−D3)/2, so 1-bit fractional data may be generated in a calculation result F. A rounding unit 113 rounds fractional data into an integer round(F), which serves as an output E from a first calculation unit 111. The rounding method is either round-down or round-up as long as it is identical to that in the inverse transforming device.

The rounded result, i.e., the calculation result E by the first calculation unit 111 is multiplied by the second weighting coefficients b0, b1, b2, and b3, and the sums are added to the corresponding inputs, respectively, outputting Di'=Di+E (i=0, 1, 2, 3) as transform results.

The same processing as the transform processing is done in inverse transform. The first calculation result of inverse transform:

$$\text{round}(a0*D0' + a1*D1' + a2*D2' + a3*D3') =$$
$$\text{round}((-D0 - D1 - D2 - D3 - 4E)/2) =$$
$$\text{round}((-D0 - D1 - D2 - D3)/2 - 2E) =$$
$$\text{round}((-D0 - D1 - D2 - D3)/2) - 2E =$$
$$\text{round}(F) - 2E = E - 2E = -E$$

In this arrangement, the transmission coefficient from the output of the first calculation unit 111 of the transforming device to that of the second calculation unit of the inverse transforming device is 1×4×(−½)=−2. As a result, the first calculation unit of the inverse transforming device outputs −E, as described above.

The inverse transforming device adds −E obtained by multiplying −E by the second weighting coefficient "1" to input data D0', D1', D2', and D3' of the inverse transforming device, thereby decoding the original data D0, D1, D2, and D3.

The transform contents in FIG. 4 when the first weighting coefficients a0, a1, a2, and a3 are "−1" and the second weighting coefficients b0 b1, b2, and b3 are "½" will be explained briefly.

In the arrangement of FIG. 4, a second calculation unit 112 multiplies the input data by the second weighting coefficient "½" and thus needs to perform round processing for each data multiplied by the second weighting coefficient. As a significant feature of FIG. 4, there are four rounding units.

Whether or not to be able to maintain reversibility depends on the four round processes. To maintain reversibility, processing equivalent to the arrangement of FIG. 3 in which the transmission coefficient is "−2" is performed or the transmission coefficient needs to be adjusted precisely to "−2".

The processing equivalent to the arrangement of FIG. 3 is to perform the same processing in the four round processes. That is, round-up or -down is uniformly done in all the four round processes. This is also an arrangement condition when round processing in the first calculation unit 111 in FIG. 3 move to the second calculation unit 112 upon an equivalent modification.

The other method of maintaining reversibility is to adjust the transmission coefficient accurately to "−2". This can be achieved by executing round-up in two of the four round processes and round-down in the remaining two.

Multiplication of the weighting coefficient "½" may generate 1-bit fractional data. If the fractional data cannot be accurately transmitted owing to round processing, the transmission coefficient changes from "−2". In other words, if the 1-bit fractional value can be transmitted through a plurality of signals, the total transmission coefficient can be set to "−2".

To do this, one of paired signals undergoes round-down and the other undergoes round-up. In this fashion, either of two signals transmits "1" at once, instead of transmitting "0.5" by each of the two signals. The 1-bit fractional value can be apparently transmitted well.

These contents will be summarized. To implement a lossless transform in the arrangement of FIG. 4, round-up is done in an even number of round processes out of four round processes, and round-down is performed in the remaining even number of round processes. In other words, a lossless transform can be performed by half of all 16 combinations, i.e., eight combinations of the four round processes.

Even for a relatively simple transform, there are many variations of round processes capable of a lossless transform. A complicated transform requires complex round processes capable of a lossless transform. Even in this case, the basic concept is to set the transmission coefficient "−2" and modify processing to be equivalent to it, thereby maintaining reversibility.

As is apparent from FIGS. 2 and 3 and the above description, an inverse transform for decoding original data from the lossless transformation data in the present invention is basically the same as transform processing.

Especially when the first calculation unit performs round processing, transform processing and inverse transform processing are completely the same, including round processing. Even when the second calculation unit executes round processing, if the round processing can be replaced with that in the first calculation unit, inverse transform can be done by the same processing as that of transform, including the round processing in the second calculation unit.

In another case, if the second calculation unit performs round processing, the round processing is executed based on the same concept as that of an inverse transform in conventional lifting calculation. More specifically, the same value as that added in lifting calculation in transform is generated even in inverse transform and subtracted, thereby decoding original data.

First, an output −E from the first calculation unit in inverse transform is multiplied by −1 to be equal to the output E from the first calculation unit in transform. Then, the resultant value is multiplied by the second weighting coefficient. The same processing as round processing by the second calculation unit in transform is applied to round processing by the second calculation unit in inverse transform, generating the same value as that in transform and subtracting the generated value.

FIGS. 5A and 5B show examples of transformed data in the arrangement examples of FIGS. 3 and 4. Pay attention to reversibility in these examples.

Application Example of First Embodiment

Figure 6:
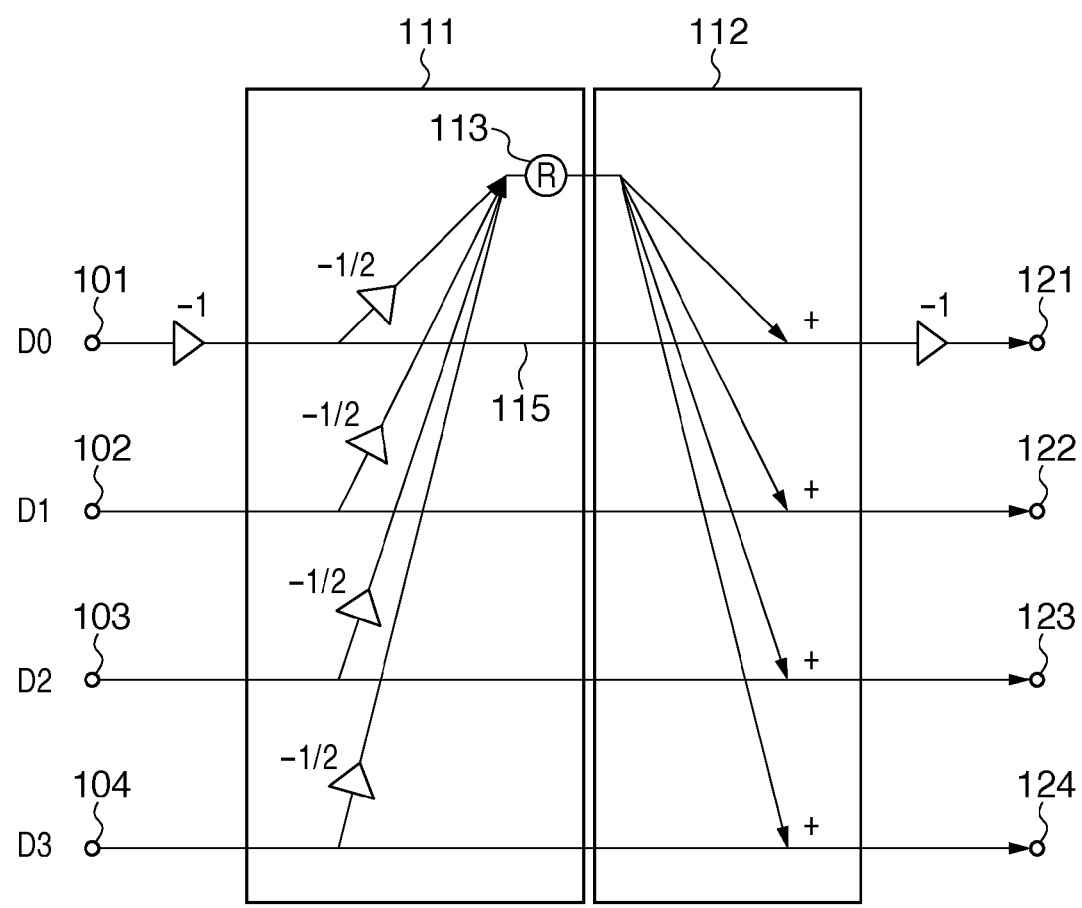
FIG. 6 is a diagram of a data transforming apparatus according to an application example of the first embodiment.

FIG. 6 shows the arrangement of an apparatus in an application example of the first embodiment.

The example directly utilizes the arrangement of the first embodiment and adds slight processes at the input and output stages of this arrangement, implementing a lossless Hadamard transform which is a most basic transform in images data compression coding.

In FIG. 6, a first sign inverter is added to the arrangement of FIG. 3 to invert the sign of the first input data. Also, a second sign inverter is added to invert the sign again when outputting transformed data of the first input data. By executing a transform with this arrangement, a fourth-order lossless Hadamard transform can be done.

The operations of the first and second sign inverters are represented by matrices. In each matrix, the sign of an element on the first row and first column of identity matrix is inverted into −1. The first sign inverter acts on input data, and the second sign inverter acts on a transformed output data. Hence, the result of multiplying the left- and right-hand sides of transform matrix (5) by the sign-inverting matrix is a fourth-order Hadamard transform matrix:

$$\begin{bmatrix} -1 & 0 & 0 & 0 \\ 0 & 1 & 0 & 0 \\ 0 & 0 & 1 & 0 \\ 0 & 0 & 0 & 1 \end{bmatrix} \frac{1}{2}\begin{bmatrix} 1 & -1 & -1 & -1 \\ -1 & 1 & -1 & -1 \\ -1 & -1 & 1 & -1 \\ -1 & -1 & -1 & 1 \end{bmatrix}\begin{bmatrix} -1 & 0 & 0 & 0 \\ 0 & 1 & 0 & 0 \\ 0 & 0 & 1 & 0 \\ 0 & 0 & 0 & 1 \end{bmatrix} = \qquad(6)$$

$$\frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}$$

The arrangement shown in FIG. 6 provides this matrix.

Needless to say, a lossless Hadamard transform can also be achieved by even an arrangement in which the first and second sign inverters are added at the preceding and subsequent stages of the transforming apparatus shown in FIG. 4.

Second Embodiment

Figure 7:
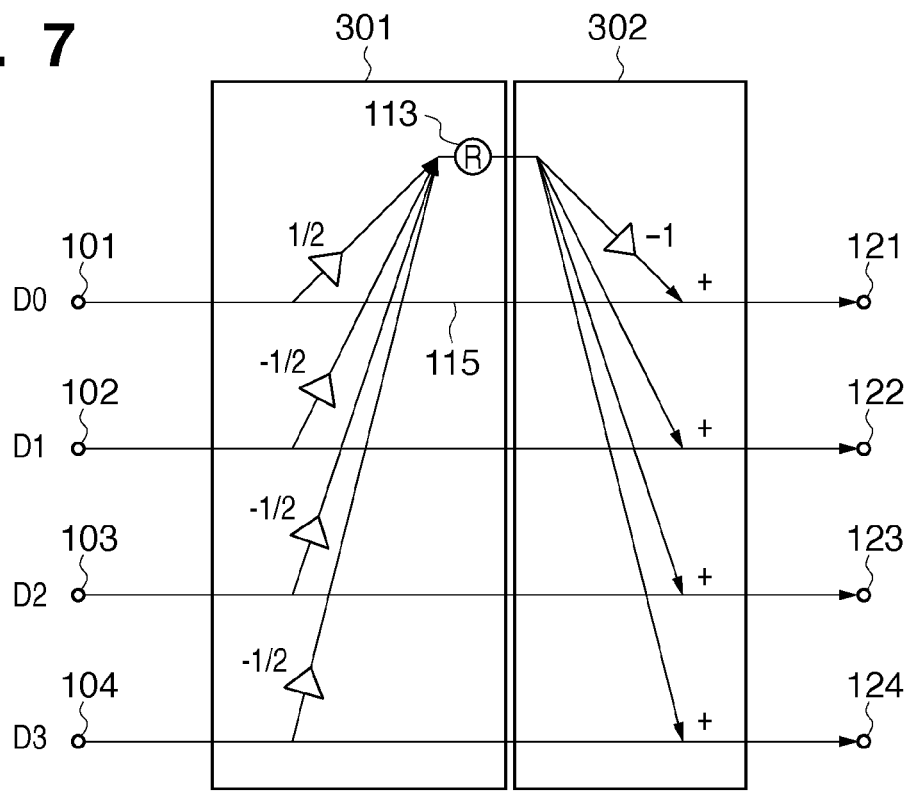
FIG. 7 is a diagram of a data transforming apparatus according to the second embodiment.

FIG. 7 shows the arrangement of a data transforming apparatus in the second embodiment of the present invention. The transform matrix of this arrangement is the same as the matrix on the right-hand side of matrix (6) in the application example. In the second embodiment, a first calculation unit 301 and second calculation unit 302 respectively absorb and integrate two sign inverters arranged at the input and output stages in the application example.

First weighting coefficients a0, a1, a2, and a3 are ½, −½, −½, and −½, respectively. Second weighting coefficients b0, b1, b2, and b3 are −1, 1, 1, and 1, respectively. At this time, a0*b0+a1*b1+a2*b2+a3*b3=−2.

In the arrangement of FIG. 7, sign inverters exist on a data path 115 in which the signs of the first and second weighting coefficients for the first input data are inverted and no weighting coefficient is multiplied. However, the sign inverter on the input side and that on the output side cancel each other as if no sign inverter existed on the data path, resulting in the arrangement shown in FIG. 7.

When processing by a rounding unit 113 in the first calculation unit 301 according to the second embodiment is "round-down", the calculation result E of the first calculation unit 301 is $$E = \text{round}((D0 - D1 - D2 - D3)/2)$$
$$= (D0 - D1 - D2 - D3) >> 1$$

(where x>>1 is a shift of x to the right by one bit.)

By using the calculation result E, a transform output is calculated by $$D0' = D0 - E$$

$$D1' = D1 + E$$

$$D2' = D2 + E$$

$$D3' = D3 + E$$

A lossless Hadamard transform can be performed by various calculation methods. The above calculation method can execute a calculation at high speed under control of both software and hardware, and makes the best use of features of the present invention.

Conventionally, a lossless Hadamard transform could be calculated quickly by only either software or hardware. However, the calculation method based on the present invention can perform a high-speed calculation by both software and hardware processes. The software and hardware processes can employ the same calculation method.

If round processing to obtain an integer is not performed, a fourth-order Hadamard transform by real-number calculation is done. Even the real-number Hadamard transform can also be calculated quickly.

Figure 8:
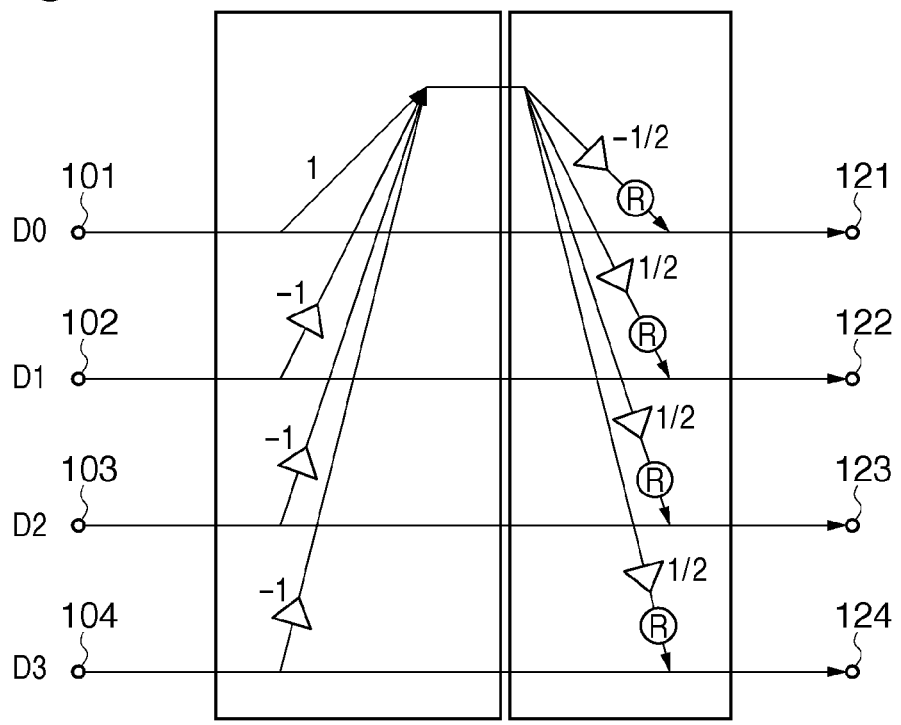
FIG. 8 is a diagram of another data transforming apparatus according to the second embodiment.

When the above-mentioned sign inversion is executed based on the arrangement of FIG. 4 in the above-described first embodiment, the first weighting coefficients a0, a1, a2, and a3 become 1, −1, −1, and −1, respectively, and the second weighting coefficients b0, b1, b2, and b3 become −½, ½, ½, and ½, respectively. Then, the second calculation unit performs round processing, similar to FIG. 4. FIG. 8 shows an arrangement in this case.

When round processing by the first calculation unit in the arrangement of FIG. 7 is "round-down", round processing by the second calculation unit in FIG. 8 equivalent to that round processing is "round-up" for only the first data and "round-down" for the second to fourth data.

This is because only the sign of the first data sequence in the round processing result of the first calculation unit is inversed in matrix (6).

Also, when round processing by the first calculation unit is "round-up", round processing by the second calculation unit in FIG. 8 equivalent to that round processing is "round-down" for only the first data and "round-up" for the second to fourth data. Round processes when inversely transforming data transformed by these round processes suffice to be the same as those in transform.

Similar to the first embodiment, there are many kinds of round processes capable of a lossless transform which are not equivalent to those in FIG. 7.

Data paired with the first data undergoes the same round processing as that of the first data, and the two remaining data undergo opposite round processes each other, thereby setting the transmission coefficient "−2". Under this condition, there are six types of round processes. An inverse transform for these round processes is performed as follows, similar to the first embodiment.

An output −E from the first calculation unit in inverse transform is multiplied by −1 to make its sign coincide with that of the output E from the first calculation unit in transform, thereby obtaining the same value. After the resultant value is multiplied by the second weighting coefficient, the same value as that in transform is reproduced by applying the same processing as round processing by the second calculation unit in transform. In transform, this value is added to input data to obtain transformed data. In inverse transform, therefore, the original input data can be reconstructed by subtracting this value.

Third Embodiment

Figure 9:
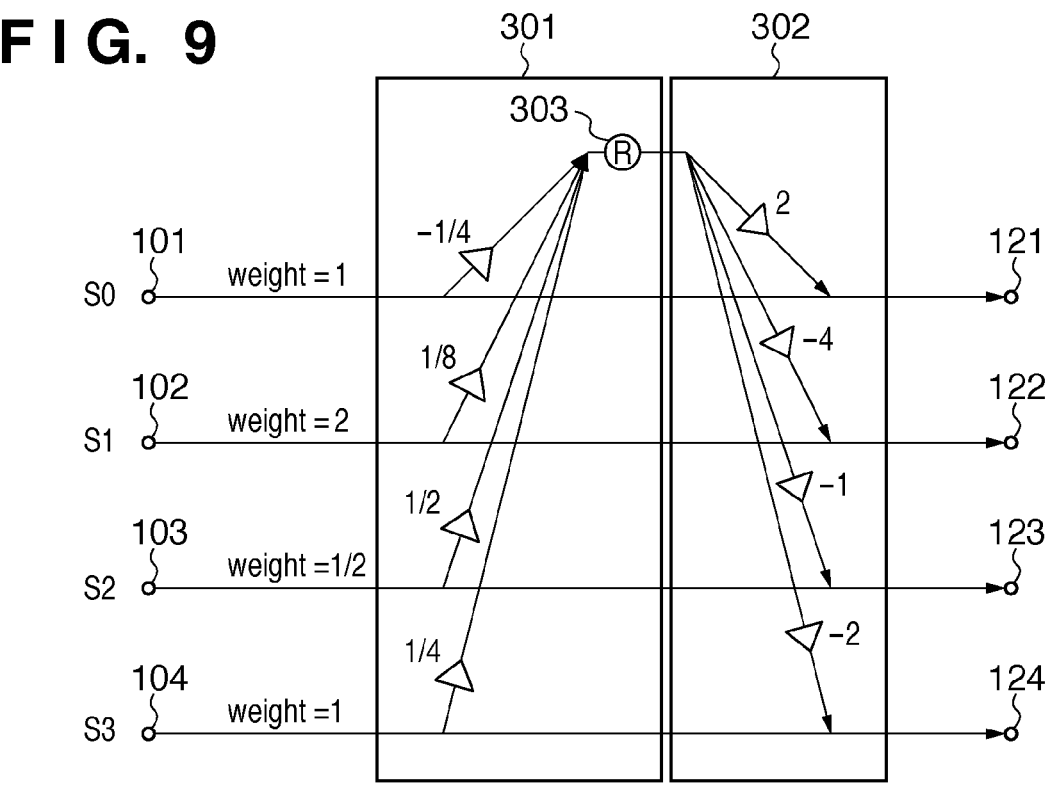
FIG. 9 is a diagram of a data transforming apparatus according to the third embodiment.
Figure 10:
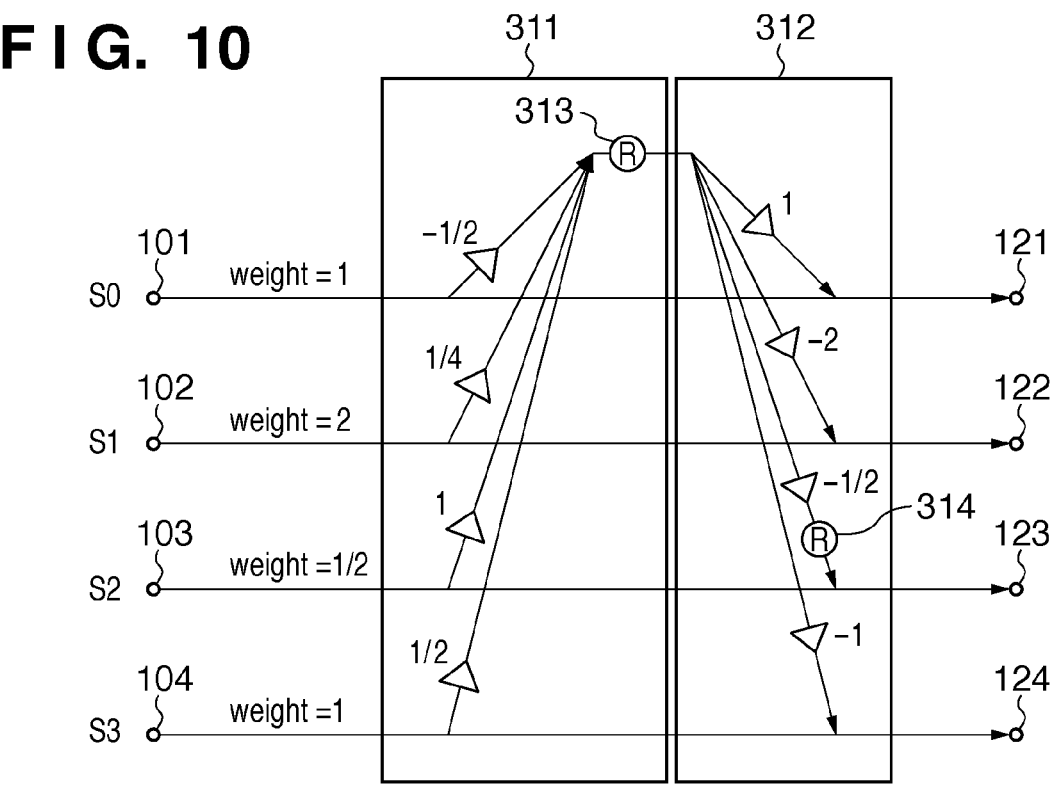
FIG. 10 is a diagram of another data transforming apparatus according to the third embodiment.

FIGS. 9 and 10 show the arrangements of a data transforming apparatus in the third embodiment of the present invention.

The arrangements shown in FIGS. 9 and 10 can perform a fourth-order lossless Hadamard transform for weighted input data.

Before a description of the third embodiment, weighted data will be explained briefly.

Weighted data are generated in various situations. For example, in a lossless transform in image coding directed to the present invention, weighted transformed data is generated as a result of a lossless rotational transform by a smaller number of lifting calculations.

Figure 12:
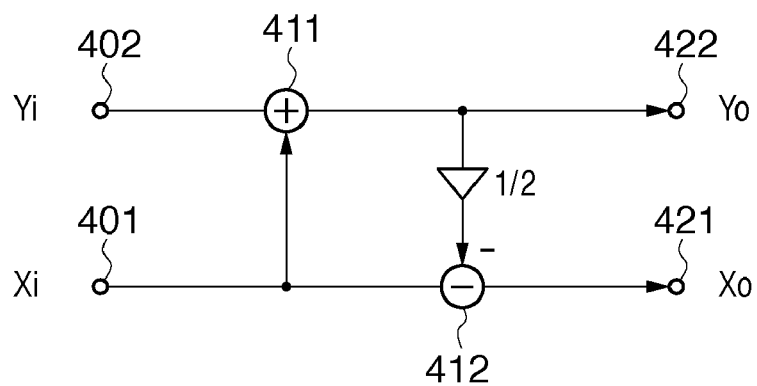
FIG. 12 is a circuit diagram showing two lifting calculations.

As the simplest example, FIG. 12 shows an arrangement which achieves a 45° rotation by two lifting calculations. It is known that three lifting calculations are required to implement a normal rotational transform which generate unweighted rotated data. If rotational transform is done by two lifting calculations, data is transformed into weighted one.

A weight generated by the transform of FIG. 12 is (COS 45°, 1/COS 45°), i.e., $(1/\sqrt{2}, \sqrt{2})$. An adder 411 adds data Xi input from a terminal 401 to data Yi input from a terminal 402, outputting data Yo from a terminal 422. The data Yo has a wide range and is weighted with $(\sqrt{2})$. The data Yo is multiplied by ½, and a subtracter 412 subtracts the product from data on the lower side, outputting data Xo from a terminal 421. The data Xo has a narrow range and is weighted with $(1/\sqrt{2})$.

If input data (10, 0) is rotated counterclockwise by 45°, the rotation result should be originally transformed into $(5\sqrt{2}, 5\sqrt{2})$. However, the arrangement of FIG. 12 transforms the input data into (10, 0+10) by the first lifting calculation and then into (10−10/2, 10)=(5, 10) by the second lifting calculation, resulting in weighted data.

It will readily occur that data is weighted with "2" or "½" upon repetitive weighting transform.

In view of this, the third embodiment will describe two examples of an arrangement capable of performing the fourth-order lossless Hadamard transform for input data weighted with 1, 2, ½, and 1, respectively.

In the arrangement shown in FIG. 9, first weighting coefficients a0, a1, a2, and a3 are −¼, ⅛, ½, and ¼, respectively. Second weighting coefficients b0, b1, b2, and b3 are 2, −4, −1, and −2, respectively.

In the arrangement shown in FIG. 10, the first weighting coefficients a0, a1, a2, and a3 are −½, ¼, 1, and ½, respectively. The second weighting coefficients b0, b1, b2, and b3 are 1, −2, −½, and −1, respectively.

Both the arrangements satisfy the condition "a0*b0+a1*b1+a2*b2+a3*b3=−2".

In the arrangement of FIG. 9, all the second weighting coefficients are integers. A first calculation unit 301 includes a rounding unit 303 and outputs integer values, so a second calculation unit 302 need not execute round processing (need not include a rounding unit). This arrangement has been described repetitively in the above embodiments and can achieve a lossless transform based on the same principle as the foregoing one.

In the arrangement of FIG. 9, however, data once rounded into integers are used after doubled or quadrupled by the second calculation unit 302. Distortions superposed on data upon rounding are doubled or quadrupled as well, increasing the distortions upon rounding.

The arrangement shown in FIG. 10 will suppresses distortions caused by rounding. Data rounded into an integer by a first calculation unit 311 is multiplied by 2 at maximum, then used by a second calculation unit 312.

Only one weight (−½) whose absolute value is smaller than 1 exists among the second weighting coefficients in the second calculation unit 312. A rounding unit is necessary to round data multiplied by this coefficient into an integer. For this reason, in the arrangement shown in FIG. 10, the first and second calculation units 311 and 312 include rounding units 313 and 314, respectively.

Since the number of rounding units in the second calculation unit 312 is one, the method applied to the above-mentioned embodiments cannot set the transmission coefficient "−2", failing in a lossless transform. The third embodiment therefore adopts the second method among the three rounding methods.

To set the transmission coefficient "−2" in the arrangement shown in FIG. 10, a fractional value rounded down by the rounding unit of the second calculation unit is superposed on another data. Alternatively, a fractional value rounded up by the rounding unit needs to be subtracted from another data. For descriptive convenience, a fractional value (½ or 0) is assumed to be rounded down in the round processing.

A value to be superposed on another data is limited to an integer. To give the meaning of ½ to the integer, the ratio of first weighting coefficients in decoding needs to be 2:1 between rounded-down data and superposed data.

In the arrangement of FIG. 10, the fourth data satisfies this relation with respect to the third data rounded down by round processing of the second calculation unit 312. Although not shown in FIG. 10, the rounded-down fractional value is doubled to be an integer, and the integer is added to the fourth data.

This processing can attain the transmission coefficient "−2", enabling a lossless transform. FIGS. 11A and 11B show examples of the data transform in the third embodiment.

Fourth Embodiment

Figure 13:
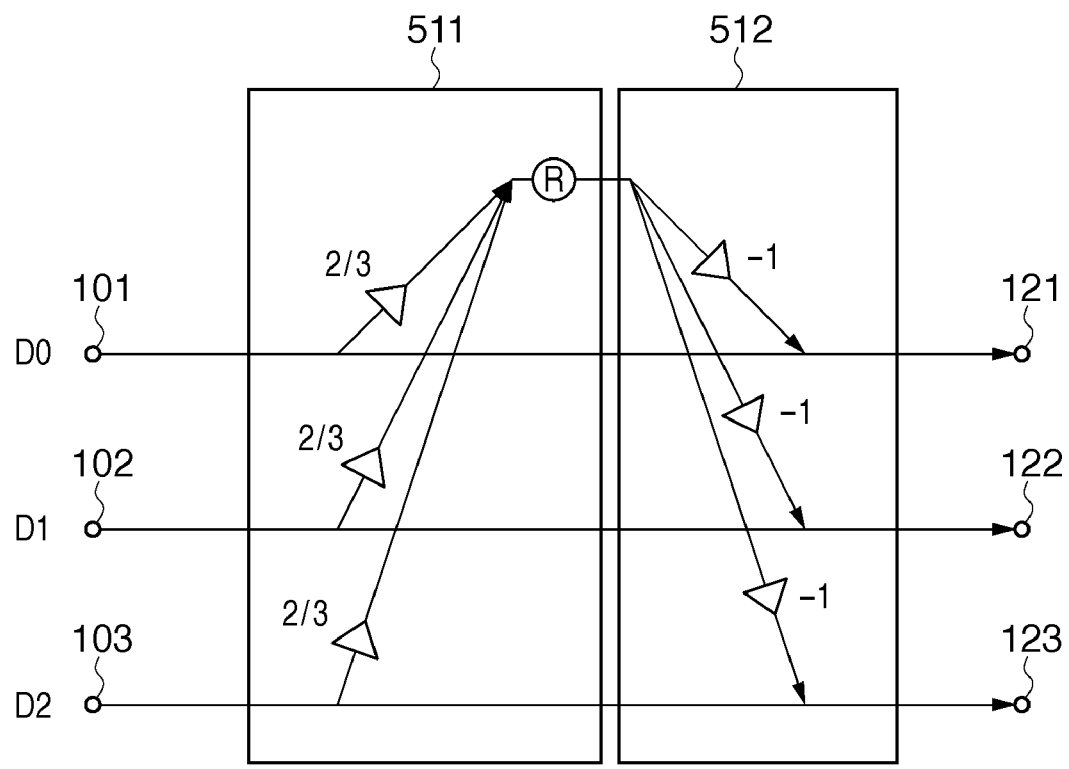
FIG. 13 is a diagram of a data transforming apparatus according to the fourth embodiment.

FIG. 13 shows the arrangement of a data transforming apparatus according to the fourth embodiment of the present invention. Although the above embodiments have explained only a fourth-order transform for four input data, the present invention is also applicable to transforms of other orders. The fourth embodiment will exemplify a third-order orthogonal transform.

In the arrangement shown in FIG. 13, all first weighting coefficients a0, a1, and a2 in a first calculation unit 511 are ⅔, and all second weighting coefficients b0, b1, and b2 in a second calculation unit 512 are −1. These weighting coefficients satisfy a0*b0+a1*b1+a2*b2=−2, i.e., the transmission coefficient is "−2". A transform implemented by these weighting coefficients can be given by $$\frac{1}{3}\begin{bmatrix} 1 & -2 & -2 \\ -2 & 1 & -2 \\ -2 & -2 & 1 \end{bmatrix} \quad (7)$$

In this transform matrix, respective rows are orthogonal to each other, and the square sum of elements on each row is 1. Hence, this transform matrix is an orthonormal matrix.

Since all the second weighting coefficients b0, b1, and b2 are integers, round processing can be done in only the first calculation unit 511. If division by 3 is possible, the transmission coefficient can be easily set to "−2". Software processing in a PC and the like can execute such division.

In hardware processing of which high-speed processing is required, a divider hardly executes division by 3, and approximate calculation by multiplication is often performed instead. In this case, a value approximate to ⅔ is multiplied. For example, ⅔ approximated to a 12-bit fractional value is represented by 1365/2048, and this value is multiplied.

Generally speaking, approximate calculation produces a calculation error and generates fractional data even for a value divisible by 3. The calculation error produced by the approximate calculation is superposed on transformed output data after multiplied by the second weighting coefficient on the transform side, and propagates to the output of the first calculation unit 511 in inverse transform.

Round processing by the first calculation unit in inverse transform needs to be effective for only the result of multiplying only original input data components by the first weighting coefficients and summating the products. However, the calculation error added by the approximate calculation makes it difficult to grasp the influence of round processing.

In this situation, the transmission coefficient has a nonlinear characteristic, is not a constant, and cannot be set to "−2" any more. A lossless transform is therefore achieved by maintaining the calculation precision so that the first calculation unit on the inverse transform side outputs −E with respect to the output E from the first calculation unit 511 on the transform side, in place of adjusting the transmission coefficient itself to "−2".

For this purpose, the approximation precision of ⅔ may need more accuracy. When three input data in transform fall within the range of 0 to 255 and ⅔ is approximated by 1365/2048, an output from the first calculation unit in inverse transform becomes −E and a lossless transform can be realized. It is easy to verify that the output from the calculation unit always becomes −E while the input data fall within that range. Larger input data lead to a larger multiplication error. Thus, it suffices to confirm that this output becomes −E when all the three input data take values near a maximum value of 255 or smaller and their sums are 3n, 3n+1, and 3n+2. If the approximation precision lacks even by 1 bit, the input data take values near 255 and the output from the calculation unit changes from −E, losing reversibility. Reversibility when the transmission coefficient is set to "−2" and that when the output from the calculation unit is set to −E are different in that the former is completely independent of the magnitude of input data, but the latter is guaranteed only when the magnitude of input data falls within a predetermined range.

Again, in the case of a value divisible by 3, the signal is transmitted for each ⅓ using three data paths according to the third method described before the first embodiment. A method of slightly changing round processing after division by 3 is also available.

Fifth Embodiment

Figure 14:
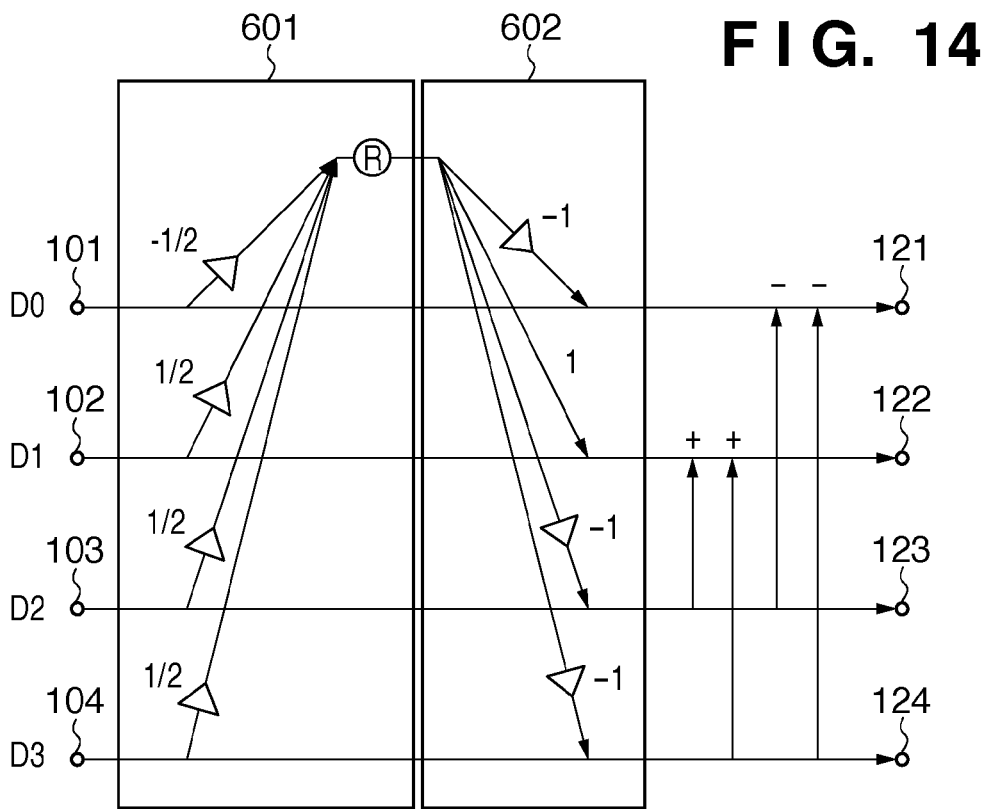
FIG. 14 is a diagram of a data transforming apparatus according to the fifth embodiment.

FIG. 14 shows an arrangement in which four lifting calculations are combined as an arrangement in the fifth embodiment of the present invention. In FIG. 14, the arrangement of the fifth embodiment for the transmission coefficient=0 is arranged at the preceding stage, and four lifting calculations are done at the subsequent stage. This arrangement implements a lossless Hadamard transform.

In FIG. 14, first weighting coefficients a0, a1, a2, and a3 in a first calculation unit 601 according to the fifth embodiment are −½, ½, ½, and ½, respectively. Second weighting coefficients b0, b1, b2, and b3 in a second calculation unit 602 are −1, +1, −1, and −1, respectively. These weighting coefficients satisfy a0*b0+a1*b1+a2*b2+a3*b3=0, i.e., the transmission coefficient=0. A transform implemented by these weighting coefficients can be given by $$\frac{1}{2}\begin{bmatrix} 3 & -1 & -1 & -1 \\ -1 & 3 & 1 & 1 \\ 1 & -1 & 1 & -1 \\ 1 & -1 & -1 & 1 \end{bmatrix} \quad (8)$$

Figure 15:
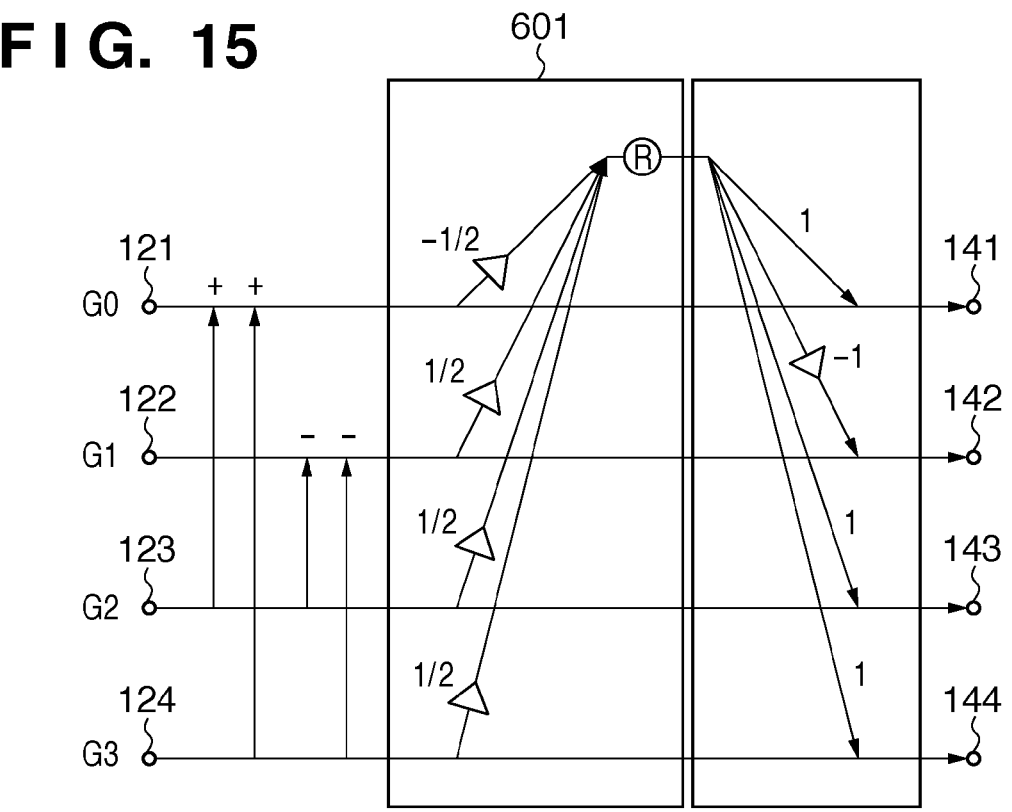
FIG. 15 is a diagram of a data transforming apparatus which performs inverse transform processing in correspondence with FIG. 14.

FIG. 15 shows the arrangement of inverse transform processing corresponding to the transform processing shown in FIG. 14. The above embodiments have described only a case in which the transmission coefficient=−2 and the first and second weighting coefficients in inverse transform processing are the same as those in transform processing. However, for the transmission coefficient=0, the weighting coefficients differ between transform processing and inverse transform processing. The second weighting coefficients in inverse transform processing are opposite in sign to those in transform processing. The remaining processing, e.g., the first calculation unit in inverse transform processing is the same as that in transform processing.

In the fifth embodiment in which the transmission coefficient=0, an output from the first calculation unit 601 in inverse transform processing is equal to that from the first calculation unit 601 in forward transform processing. From the relationship between the second weighting coefficients in transform and inverse transform, values opposite in sign to values generated by multiplication of the second weighting coefficients in transform can be generated in inverse transform. By adding the generated values to cancel values added in transform, the original data can be reconstructed.

The meaning of the four lifting calculations in FIG. 14 will be explained. In transform matrix (8), both the third and fourth rows of the transform matrix are added to the second row and subtracted from the first row, obtaining a Hadamard transform matrix on the right-hand side shown in matrix (6). This processing of adding the third and fourth rows to the second row and subtracting them from the first row is the lifting calculations in FIG. 14.

It is difficult to achieve an effective transform by only the arrangement for the transmission coefficient=0. However, when combined with lifting calculations, even this arrangement can implement an effective transform, like a fourth-order lossless Hadamard transform.

The above-described lossless transform processing (apparatus) is applied to part of a DCT transform used in, e.g., JPEG coding. A lossless DCT transform can be calculated quickly, and DCT-based JPEG coding capable of seamlessly executing lossless compression and lossy compression can be performed at high speed.

Especially, when the configuration of lossless Hadamard Transform shown in FIG. 7 is implemented to a hardware circuit, the size of the circuit illustrated in FIG. 7 can be smaller than that of other circuits shown in FIGS. 6, 8 and 14, thereby the circuit needs little electricity to work. Accordingly, it will be understood that it is useful for a industrial product compressing data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments.

This application claims the benefit of Japanese Patent Application No. 2008-331190, filed Dec. 25, 2008, which is hereby incorporated by reference herein in its entirety.

What is claimed is:

1. A data transforming apparatus including input terminals for inputting a plurality of input data and output terminals for outputting a plurality of transform results, the apparatus comprising:

a first calculation unit which multiplies data input to the input terminals by first weighting coefficients set for the respective input data and summates weighted data;

a second calculation unit which multiplies calculation results obtained from said first calculation unit by second weighting coefficients set for the respective input data and adds products to the respective input data; and a rounding unit which is arranged in at least one of said first calculation unit and said second calculation unit that multiplies non-integer weighting coefficients, and rounds non-integer calculation results into integers, wherein a sum of products of the first weighting coefficients and the second weighting coefficients for respective input data takes either of 0 and −2, and wherein said units are implemented at least in part by a computer.

2. The apparatus according to claim 1, wherein both data input to the input terminal and transformed data output from the output terminal are integer data.

3. The apparatus according to claim 1, wherein the input terminals input four data, the first weighting coefficients consist of four coefficients $\{1/2, -1/2, -1/2, -1/2\}$, the rounding unit is arranged in the first calculation means, the rounding unit rounds a non-integer calculation result, obtained by multiplying four input data by the four coefficients respectively and summating the multiplied data, into an integer, and output the integer as an output of the first calculation unit, the second coefficients consist of four coefficient $\{-1, 1, 1, 1\}$, and the second calculation unit multiplies the integer from said first calculation unit by the second coefficients respectively, adds the products to the respective corresponding four input data and outputs the four data as integers of lossless Hadamard transformed results.

4. A method of controlling a data transforming apparatus which generates a plurality of transformed data from a plurality of input data and outputs the transformed data, the method comprising:

a first calculation step of causing a first calculation unit to multiply the input data by first weighting coefficients set for the respective input data and summate weighted data;

a second calculation step of causing a second calculation unit to multiply calculation results obtained in the first calculation step by second weighting coefficients set for the respective input data and add products to the respective input data; and a rounding step of causing a rounding unit to round non-integer calculation results into integers in at least one of the first calculation step and the second calculation step in which non-integer weighting coefficients are multiplied, wherein a sum of products of the first weighting coefficients and the second weighting coefficients for respective input data takes either of 0 and −2, and wherein said steps are implemented at least in part by a computer.

5. The method according to claim 4, wherein both the input data and the transformed data are integer data, and wherein said units are implemented at least in part by a computer.

* * * * *